(12) United States Patent
Jung

(10) Patent No.: US 6,354,600 B1
(45) Date of Patent: *Mar. 12, 2002

(54) SEGMENT FOR A SEAL

(76) Inventor: Alfred Jung, Birresborner Str. 4, Köln (DE), 50935

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/147,451

(22) PCT Filed: Jun. 11, 1997

(86) PCT No.: PCT/DE97/01174

§ 371 Date: Dec. 28, 1998

§ 102(e) Date: Dec. 28, 1998

(87) PCT Pub. No.: WO97/49939

PCT Pub. Date: Dec. 31, 1997

(30) Foreign Application Priority Data

Jun. 26, 1996 (DE) ..................................... 296 11 172 U

(51) Int. Cl.[7] .................................................. F16J 9/04
(52) U.S. Cl. ........................ 277/609; 277/608; 285/368
(58) Field of Search ................................. 277/608, 609; 285/18, 23, 368

(56) References Cited

U.S. PATENT DOCUMENTS 3,721,452 A * 3/1973 Black .......................... 277/609
3,781,043 A   12/1973 Hagmann ..................... 285/363
4,002,344 A * 1/1977 Smith ......................... 277/609

FOREIGN PATENT DOCUMENTS

| CH | 528 040     | 9/1972  |
| DE | 94 05 913 U | 11/1994 |
| DE | 295 06 929 U1 | 7/1995 |

* cited by examiner

Primary Examiner—Anthony Knight
Assistant Examiner—Enoch E Peavey
(74) Attorney, Agent, or Firm—Jacobson Holman, PLLC

(57) ABSTRACT

The invention relates to a segment for a sealing arrangement, wherein a plurality of such segments can be attached to the circumference of a sealing ring for centering the sealing arrangement while the latter is installed between two flanges. Each segment comprises a curved centering flank, a further flank serving as a point of attack for a rotating mechanism, and a third flank for attachment of the segment to the sealing ring. The segment is provided as a one-pieced unit of a relatively small size. The segments can be mounted irrespective of the nominal pressure and the nominal diameter. This allows for an inexpensive manufacture of the sealing arrangement. Various embodiments of segments are described.

8 Claims, 2 Drawing Sheets

SEGMENT FOR A SEAL

The present invention is directed to a segment for a sealing arrangement serving as a point of attachment for a pin for rotating the segment about the axis of the sealing arrangement.

A segment of the above type is disclosed in DE GM 94 05 913. A plurality of such segments are arranged on a flat, circular sealing ring. As illustrated in FIG. 2 of said Gebrauchsmuster, four segments are distributed at equal distances on the circumference. The four segments are integrally connected to a centering ring which in turn is mounted to the sealing ring. Alternatively, the centering ring can be loosely guided in an annular groove extending on the outer circumference of the sealing ring, with the centering ring thus being connected to the sealing ring. In this manner, the sealing ring together with the centering ring and the four segments will form a sealing arrangement, while the segments and the centering ring form a one-pieced unit.

During assembly, this arrangement makes it possible that the centering ring will be centered between the two plane sealing surfaces of the flanges. Thus, for instance, if it is desired to provide a flange connection of a specific predetermined nominal diameter and a specific pressure stage, the sealing arrangement is to be placed between the two sealing surfaces, and four flange bolts are to be inserted through opposite holes of the flanges. In doing so, the bolts are arranged at four radii which are displaced by 90° relative to each other. Now, the sealing arrangement will be turned until the curved contours of the segments abut the bolts simultaneously. In this manner, the sealing ring can be centered. In a case where, with the same nominal diameter of the flange, a higher pressure stage exists, the bolts have a larger distance from the center; thus, they are located on a larger diameter of the bolt pitch circle. If, with the same nominal diameter, the pressure stage is lower, the diameter of the bolt pitch circle is smaller. Thus, for instance, with a given flange diameter and with pressure stages of PN 10 to PN 400, there exist nine different diameters of the bolt pitch circle. Although different pressure stages may exist, the same sealing arrangement can be used.

The outer diameter of a sealing ring shall not be larger than the diameter supporting the inner edges of the flange bolts. The associated diameter of the bolt pitch circle belongs the lowest pressure stage. All larger diameters of the bolt pitch circle belong to higher pressure stages. Thus, the largest pressure stage occurring is associated to the largest diameter of the bolt pitch circle. Bolts inserted through this diameter of the bolt pitch circle must still be allowed to abut on the curved flanks of the segments. This configuration will establish the outer diameter of the sealing arrangement.

Of course, a diameter of the bolt pitch circle can also have more than four holes arranged thereon. For centering, however, it is sufficient to use as few as four bolts in uniform distribution on the circumference, and to insert and tighten the rest of the bolts at a later time, i.e. after centering.

The sealing arrangement of the state of the art offers the advantage that, with a given nominal diameter, use can be made of the same sealing arrangement, irrespective of the pressure stage and thus of the diameter of the bolt pitch circle. A disadvantage is caused in that this sealing arrangement requires a relatively complex manufacturing process because a centering ring with the segments must be mounted to the outer circumference of the sealing ring, wherein the centering ring with the segments requires an undesirably large amount of material. The centering ring with the segments consists of a punched or burnt-out component. A disadvantage of the centering ring integrally connected to the segments resides in its expensive price, because of the high time requirements for the burn-out process or the high costs for punching due to the expensive tools. Further, an individual tool is required for each nominal width, adding considerably to the expenses for the sealing arrangement.

Thus, it is an object of the invention to provide a sealing arrangement which can be produced at a considerably lower cost.

The above object is solved by the features of the instant inimation.

The present sealing arrangement comprises the sealing ring and four flat segments which are mounted to the circumference in uniform distribution thereon. A segment is generally of a triangular shape, with the sides thereof forming three flanks of the segment. The first flank has a curved shape and serves as a centering flank which upon centering is moved to abut the bolt. The curvature substantially corresponds to the shape of a circular arc; however, it can also be spiral-shaped.

The second flank serves as a point of attack for rotating the sealing arrangement. For this purpose, there is suitably used a pin of which one end engages the second flank and of which the other end projects toward the outside from the two flanges and thus can be manually gripped to rotate the sealing arrangement. The point of attack of the pin on the second flank can be provided in various manners; for instance, the end of the pin can be of a forked shape with two short legs configured to seize the outer edge of the second flank by clamping. For this purpose, the outer edge of the second flank can be tapered in the outward direction, and the fork on the pin can also have a tapering to thus allow for a good clamping effect. Alternatively, the second flank can also have two abutment faces arranged in series with each other in the circumferential direction and adapted for insertion of a pin therebetween. The pin can then be inserted from outside between the two abutment faces. This allows for an easy access to the region between the two flanges to rotate the sealing arrangement until the first flanks abut the already inserted bolts.

By means of the third flank, the segment is attached to the sealing ring. The third flank, which can have the shape of a circular arc, can come into abutment on the outer circumference of the sealing ring along the whole length of the third flank and will then be attached to the sealing ring. In this case, however, individual segments must be produced for each given outer diameter of the sealing ring. If, however, the third flank has the shape of an obtuse angle formed by two substantially linear legs, the segment can be brought into abutment on two points of the outer circumference of the sealing ring. This configuration has the advantage that the third flank can be applied to sealing rings of different diameters. With an increasing diameter of the sealing ring, the points of abutment will be located at a larger distance from each other, and if the diameter is smaller, they will be located closer to each other. However, also different shapes of the third flanks can be contemplated.

What is essential is that a good attachment of the segment on the sealing ring can be attained.

Segments of the above configuration can now be attached directly on the sealing ring in uniform distribution on the circumference. As to the type of attachment for the segments, different variants are possible. For instance, the segment can be fastened by welding on individual points. This will be suitable, e.g., if an abutment of the third flank is provided on two points. However, the segment can also be held on the sealing ring by a clamping effect. For this purpose, for instance, the sealing ring is provided with a tapering in the region of the outer circumference, and the third flank of the segment is provided with a groove which is likewise formed with a taper in a direction leading away from the flank. In this manner, the segment can be mounted externally on the sealing ring. Alternatively, the outer circumference of the sealing ring can be provided with an annular groove adapted for insertion of the segments, while also in this case care must be taken that a good clamping effect is achieved, which can be effected by corresponding dimensions allowing a suitable fit. Clamping connections have the advantage that, after the application of the sealing ring and after centering, the segments can be separated from the sealing ring (e.g. by means of a chisel), to be reused in an other sealing ring. When mounting the segments on the sealing ring, the 90°-angle of the radii where the segments are to be arranged and the distance of the segments from the center of the centering ring must be carefully observed, since the accuracy of the centering will depend on these factors.

The use of segments allows for a considerable reduction of the costs for the punching tool since the segments obviate the need to punch out or burn out a relatively large centering ring with attached segments. When utilizing the invention, only relatively small segments have to be punched or burnt out. A considerable amount of material will be saved, and the punching tools are smaller and thus less expensive.

If an obtuse angle is selected for the third shape, a segment can be used both for a plurality of pressure stages and for a plurality of nominal widths. Thus, in case of different nominal widths, there is no necessity anymore for different centering rings; instead, the same segments can be used, by attachment to different sealing rings of different nominal diameters, to produce sealing arrangements of different nominal diameters and nominal pressures. This contributes to a reduce the manufacturing costs.

The invention will now be explained in greater detail.

Figure 1:
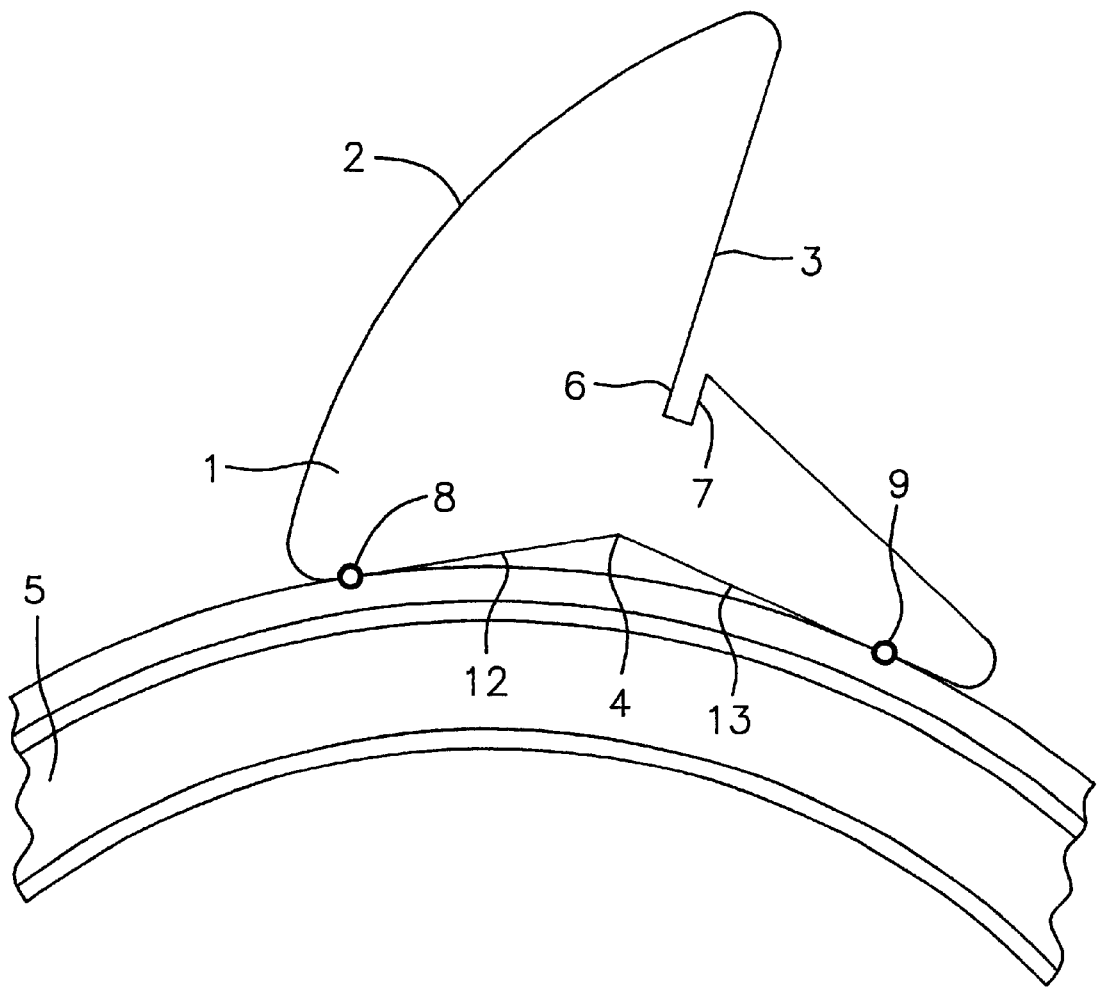
FIG. 1 shows a segment attached to the circumference of a sealing ring.

FIG. 1 illustrates a flat segment (1) comprising three flanks (2, 3 and 4) and fastened to a sealing ring (5). The first flank (2) is the centering flank and has a curved shape. The shape can correspond, e.g., to the shape of a circular arc or be a spiral shape. The second flank (3) is engaged by a pin (not shown) which is to be inserted between the two flanges from the outside and on the inside is connected to the second flank either by clamping or by a positive connection. FIG. 1 shows the second flank in the case where a positive connection is provided for the segment and the pin. In this case, two abutment faces (6,7) are provided in series as viewed in the circumferential direction, allowing the pin to be inserted therebetween. When inserted, the pin can be rotated along with the sealing arrangement about the axis of the sealing arrangement until the first flanks come into abutment on the bolts, so that the sealing arrangement is centered. The third flank (4) is formed to present an obtuse angle, with the two linear legs (12,13) abutting on two points (8,9) of the outer circumference of the sealing ring (5) and being attached by welding to the contact points.

Figure 2:
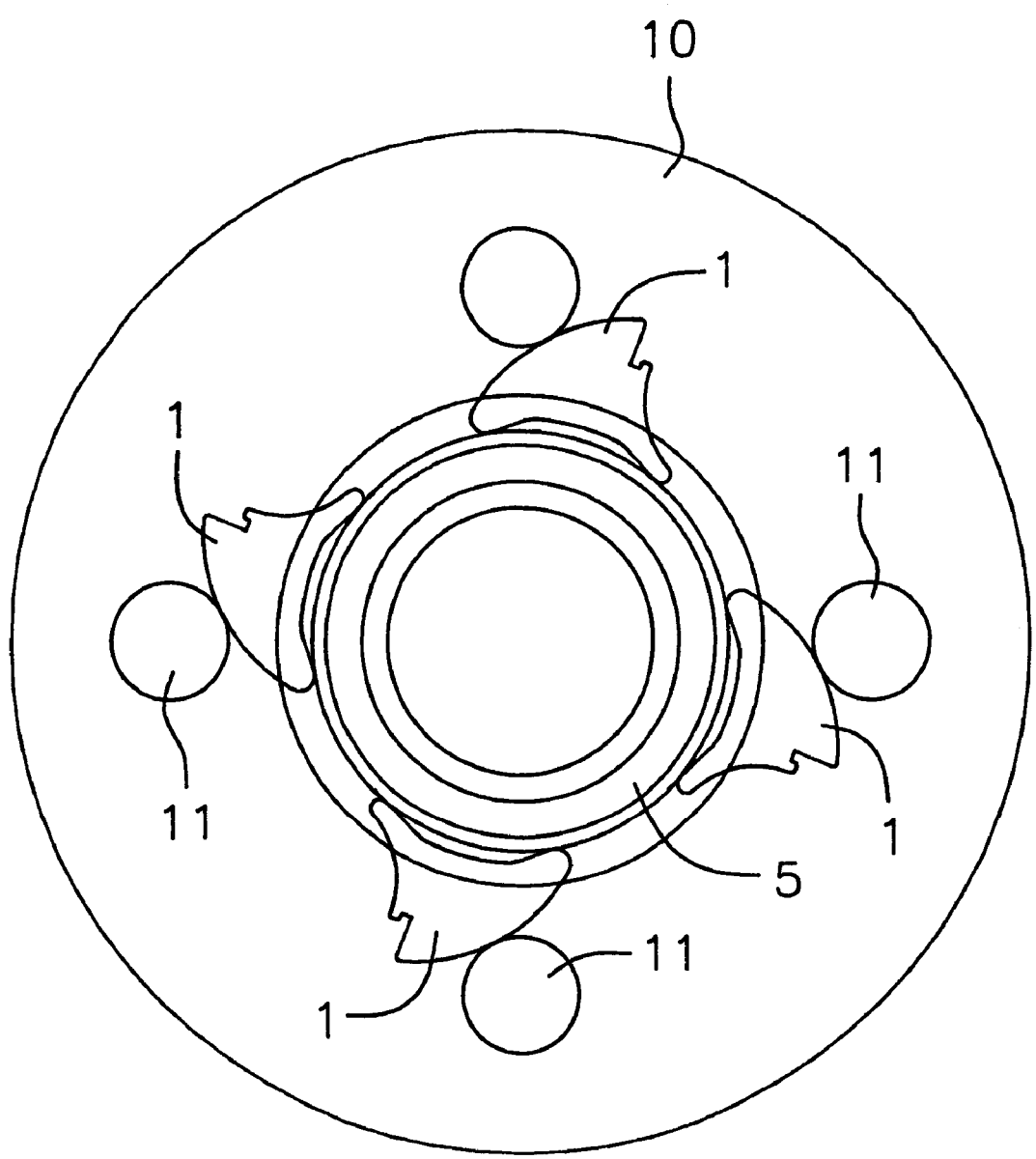
FIG. 2 shows a sealing arrangement in abutment on the bolts of a flange for centering.

FIG. 2 is a view of the sealing ring (5) centered in a flange (10). Four segments (1) have their curved flanks abutting on four bolts (11).

What is claimed is:

1. A segment useful as a part of a sealing arrangement, the segment comprising a separate, flat, substantially triangular, one-piece unit, the three sides of the triangle formed by first, second, and third flanks of the segment, characterized in that:

the first flank (2) is a centering flank having a curved shape, the second flank (3) includes an adaptation for engaging a pin by which the segment rotates about the axis of the sealing arrangement, and the third flank (4) includes an adaptation for circumferential engagement to sealing rings (5) of differing diameters.

2. The segment according to claim 1, characterized in that the second flank adaptation for engaging the pin comprises abutment faces (6, 7) extending substantially radially and, when viewed in the circumferential direction, being arranged in series with each other at a mutual distance.

3. The segment according to claim 2, characterized in that the third flank adaptation for circumferential engagement to sealing rings of differing circumferences comprises an obtuse angle formed by two substantially linear legs (12, 13), such that the circumference of one sealing ring abuts the linear legs at two locations different than the two locations abutted by a sealing ring having a different diameter.

4. The segment according to claim 1, characterized in that the second flank adaptation for engaging the pin comprises a portion tapering towards the outside to allow for a clamping engagement with the pin.

5. The segment according to claim 4, characterized in that the third flank adaptation for circumferential engagement to sealing rings of differing circumferences comprises an obtuse angle formed by two substantially linear legs (12, 13), such that the circumference of one sealing ring abuts the linear legs at two locations different than the two locations abutted by a sealing ring having a different diameter.

6. The segment according to claim 1, characterized in that the third flank is adapted for attachment to the circumference of a sealing ring by having the shape of a circular arc corresponding to the circumference of the sealing ring.

7. The segment according to claim 1, characterized in that the third flank adaptation for circumferential engagement to sealing rings of differing circumferences comprises an obtuse angle formed by two substantially linear legs (12, 13), such that the circumference of one sealing ring abuts the linear legs at two locations different than the two locations abutted by a sealing ring having a different diameter.

8. An engagement in a sealing arrangement, comprising the segment of claim 1 engaged with a sealing ring at the circumference of the sealing ring.

* * * * *